United States Patent

[11] 3,631,285

[72] Inventors Risto J. Laisi
Amherst;
Wayne F. Galusha, Reeds Ferry; Alfred J. MacIntyre, Nashua, all of N.H.

[21] Appl. No. 16,498
[22] Filed Mar. 4, 1970
[45] Patented Dec. 28, 1971
[73] Assignee Sanders Associates, Inc.
Nashua, N.H.

[54] ELECTROLUMINESCENT DISPLAYS
12 Claims, 4 Drawing Figs.

[52] U.S. Cl. .................................................... 313/108
[51] Int. Cl. .................................................... H01j 1/62
[50] Field of Search ....................................313/308 A, 308 B, 308 D, 308 R, 109.5

[56] References Cited

UNITED STATES PATENTS 3,309,610 3/1967 Yamamoto ................ 313/108 B
3,312,825 4/1967 Robinson ................. 313/108 D

*Primary Examiner*— William L. Sikes
*Attorney*— Louis Etlinger

ABSTRACT: An electroluminescent display device is provided in which the character electrodes, the common electrode, the dielectric and phosphor layers, the filter, the interconnecting leads and the semiconductor chips form an integral structure.

INVENTORS
RISTO J. LAISI
WAYNE F. GALUSHA
ALFRED J. MACINTYRE

BY Richard J. Seligman
ATTORNEY

INVENTORS
RISTO J. LAISI
WAYNE F. GALUSHA
ALFRED J. MACINTYRE
BY Richard A. Seligman
ATTORNEY

ELECTROLUMINESCENT DISPLAYS

BACKGROUND OF THE INVENTION

Numeric readouts are provided by nixie tubes which are relatively large, require high operating voltage and are potential sources of noise. These devices do not have wide viewing angles, require rather elaborate electronics and are mechanically fragile. Alternatively, incandescent devices are employed, however, these tend to be bulky, generate much heat, consume relatively large amounts of power and are also fragile. Furthermore, the incandescent devices are relatively unreliable.

Electroluminescent readout devices have solved many of the above problems. Yet, the previously known devices use switching electronics separate from the electroluminescent device thereby making the implementation of electroluminescent devices into equipment rather cumbersome since the interface between the electroluminescent indicator and the electronics is not at a conventional logic level. Also, employing external semiconductor switches such as SCR necessitates long lead lengths which may often develop larger (stray) shunt capacities (paralleling the SCR) than the electroluminescent element to be controlled thereby having all or most of the applied voltage dropped across the electroluminescent element causing it to go on or partially on.

SUMMARY OF THE INVENTION

Accordingly, it is an object of this invention to provide a new and novel electroluminescent numeric display apparatus.

It is another object of this invention to provide an electroluminescent display apparatus having integral wiring and switching means.

It is a further object of this invention to provide an electroluminescent display apparatus incorporated into a dual in-line package.

Briefly, an electroluminescent indicator panel is provided having switching devices (e.g., SCRs) formed integral therewith and fabricated using printed circuit techniques. The integral unit may also include decoding and/or other electronic functions. The indicator may be formed into a conventional dual in-line connector for coupling to other electronic equipment. By removing the SCR from its packaging, eliminating this capacitance, and mounting the SCR as near to the electroluminescent structure as possible, eliminating lead capacitance, lighting or partial lighting of the electroluminescent element when the SCR is off will be precluded.

BRIEF DESCRIPTION OF THE DRAWINGS

The above-mentioned and other features and objects of this invention will become more apparent by reference to the following description taken in conjunction with the accompanying drawings in which.

DESCRIPTION OF PREFERRED EMBODIMENTS

Figure 1:
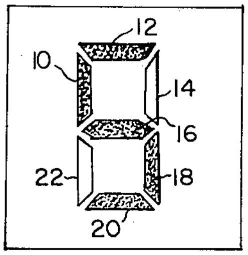
FIG. 1 is a sketch of a seven-segment electroluminescent display particularly showing the character electrodes thereof.

Referring now to FIG. 1, there is shown an electroluminescent display having preformed permanent character electrodes 10, 12, 14, 16, 18, 20 and 22 which comprise a seven-segment presentation such that any illuminated number from 0 to 9 may be produced by energizing the proper character electrodes and an electrode common to all segments. For example, the numeral 5 may be illuminated by energizing the electrodes 10, 12, 16, 18 and 20 and the common electrode. For illustration purposes, the character electrodes are shown as if disposed at the uppermost surface of the display, however, in the embodiments to be described, the dielectric layer, phosphor layer and common electrode, all lie above the character electrodes.

Although the embodiments illustrated pertain to numerical displays, this is illustrative only and the same techniques may be used for displaying letters of the alphabet, meter dials, fractional numerics, etc.

Figure 2:
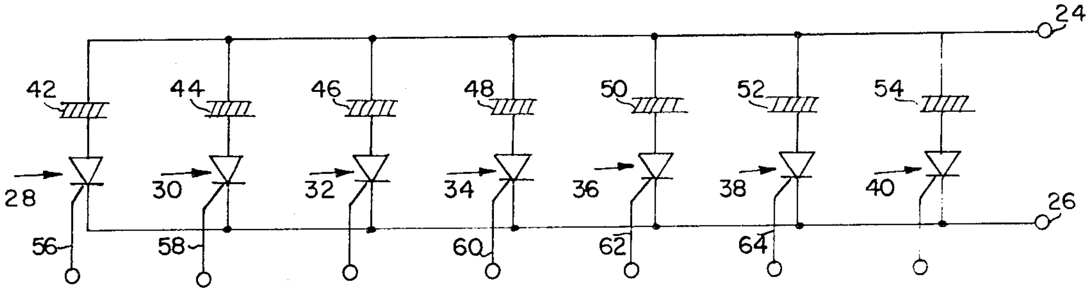
FIG. 2 is a schematic of the electrical circuit for energizing the display of FIG. 1.

The method of energizing the various electrodes is illustrated in the schematic of FIG. 2. A voltage is applied between a pair of terminals 24, 26. The voltage is normally AC, but may be pulsed or otherwise time varying. Terminal 24 is connected to the common electrode of the display. Terminal 26 is coupled to the character electrodes of the display via a plurality of silicon-controlled rectifiers (SCRs) 28, 30, 32, 34, 36, 38 and 40. The voltage will only be applied across the particular segments of the display 42, 44, 46, 48, 50, 52 and 54 when their respective SCRs are turned on by an input at the gates thereof. Segments 42, 44, 46, 48, 50, 52 and 54 have as their character electrodes, respectively, electrodes 10, 12, 14, 16, 18, 20 and 22 of FIG. 1. For example, to illuminate the numeral 5, as shown in FIG. 1, voltages are applied to the gate electrodes 56, 58, 60, 62, and 64 of SCR 28, 30, 34, 36 and 38 respectively, which turn on these particular SCRs thereby applying the energizing voltage across the particular segments. The voltages to drive the gates of the SCRs are preferably logic level inputs from a decoder (not shown).

Figure 3:
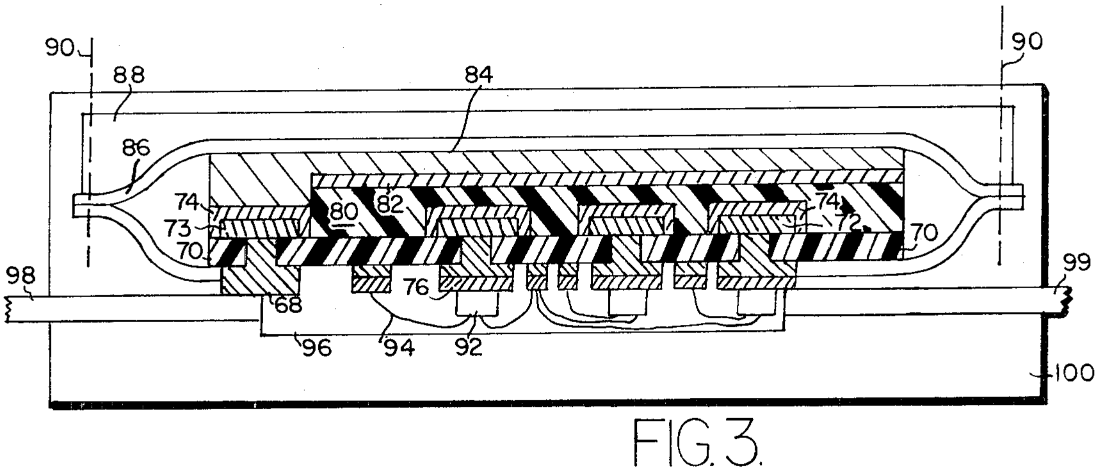
FIG. 3 is a cross-sectional view of a portion of an electroluminescent display.
Figure 4:
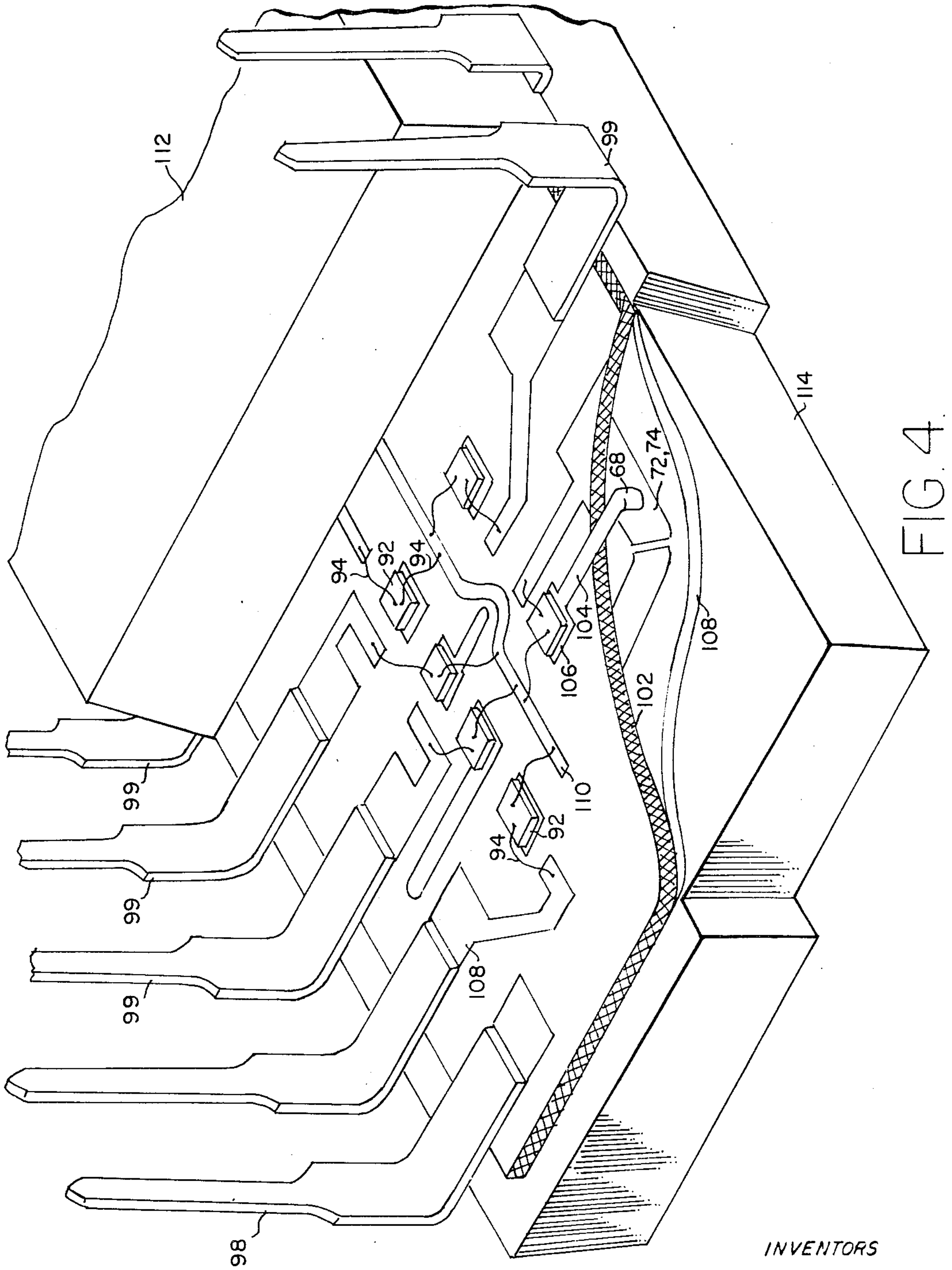
FIG. 4 is a partial perspective view of an electroluminescent numeric indicator.

In the preferred embodiment, it is desired that the electroluminescent layer, the interconnecting layers and the silicon-controlled rectifiers be built into an integral structure. This is illustrated in FIG. 3 which is indicative of a section through an electroluminescent display. FIG. 4 shows a cutaway view of a section of a compact electroluminescent numeric indicator which can be plugged into standard sockets and is compatible with conventional integrated circuit logic. Similar elements in FIGS. 3 and 4 will be indicated by the same reference designators, however, it is to be understood that the illustration in FIG. 3 is not a section of FIG. 4, but the same principles are used in the construction of both devices.

Refer now to FIG. 3. Initially, a copper sheet 66 of approximately 14-thousandths of an inch thick, which can be easily handled, is coated with photo-resist, exposed and etched to form interconnecting pillars 68. The pillars are made approximately 8- to 10-thousandths of an inch high. A layer of insulation 70 is then applied over the etched surface of copper sheet 66. The insulating material can be a material such as epoxy glass cloth, or other suitable insulating material. The assembly is then sanded, ground or otherwise thinned down on the etched side to remove the excess epoxy and leave the copper lands or pillars 68 exposed and clean. The next step is to plate over the epoxy and pillars with approximately 5 ten-thousandths of an inch of copper. This copper layer is then etched to provide a pattern 72 which comprises the character electrodes such as electrodes 10, 12, 14, 16, 18, 20 and 22 of FIG. 1, and a common electrode connecting terminal 73. The pillars 68 will be molecularly united to the electrodes. One method for forming the pillars, the etched patterns, etc., is set forth in a patent for "Method of Producing Printed Circuits," U.S. Pat. No. 3,374,129, assigned to the assignee of this application.

The patterns 72 and 73 are then plated with bright nickel or other metallic plating to form layers 74 which go over the patterns 72, 73 and about the sides thereof. This is conveniently accomplished at this time because all the patterns are connected by the bottom surface of the conductor 66 thereby facilitating a plating operation. The purpose of the metallic plating is to isolate contaminants from the phosphor and also, to provide a better reflective surface.

The unetched side of the copper sheet 66 must then be etched to form the back connections upon which SCR chips will be bonded, leads from the SCR chips will be joined, and connector leads will be attached and to form interconnections between the SCRs and character electrodes, if required; this is better illustrated in FIG. 4. The bottom surface of the unetched side of the copper plate 66 is coated with a photo resist to form a mask and the unmasked areas gold plated to provide layers 76. The resist is then removed and the remaining copper is etched down to the epoxy leaving the interconnections and back connections.

Terminal 73 is then masked off by placing a piece of tape over the contact and a dielectric layer 80 is applied over the character electrodes 72 as shown in FIG. 3. In this embodiment, the dielectric employed is barium titanate. This can be either sprayed on or cast on or applied in any other well-known manner. The layer of barium titanate is approximately 1.5-thousandths of an inch thick over the contacts. A layer of phosphor in this embodiment is approximately 1½-thousandths of an inch thick and is applied by any suitable process, such as, by spraying or silk screening.

The phosphor layer 82 comprises an electroluminescent phosphor material in which the phosphors are energizable by electric fields to produce visible light; as a specific example, the electroluminescent material may comprise zinc sulfide activated by copper and coactivated by chlorine. The mask is then removed from the contact 73 thereby exposing same, whereupon a common electrode 84 is then applied over the common electrode contact 73 and over the phosphor 82. Common electrode 84 consists of a thin, light transmitting, electrically conducting material which is coated as a thin film onto the phosphor directly or on a fibrous glass sheet or other vitreous body. Examples of suitable materials employed are tin oxide, stannic oxide or indium oxide.

The substrate is now cut to the desired dimensions and the structure laminated between two sheets of a transparent plastic. The plastic layer 86 is on the order of 5-thousandths of an inch thick and provides a moisture sealant. A sheet of circularly polarized material 88 is applied over the plastic layer 86 as shown in the drawings and this is later cut to size. In this embodiment, the polarized material is POLAROID HNCP 37. The polarized material 88 improves the contrast and also provides added mechanical support during the remaining portion of the process. The entire structure is then cut along the lines 90. Cut lines 90 are far enough outward from the structure so that the seal between the plastic layers 86 remains.

The next step in the method is to attach the SCRs to their respective pads. SCR chips 92 are bonded to their respective contact electrodes and the leads thereof 94 connected to their respective terminals. Preferably, the base of the SCR (the anode) is bonded to the pads using conductive epoxy. Wire leads are attached to their terminals and to the SCR chip by ultrasonic bonding. Alternatively, the SCR may be in a supplementary package having beam leads and these being connected to their respective terminals. A layer of epoxy 96 is then applied over the entire chip area to prevent the chips 92 from being damaged, and also prevent the leads 94 from breaking.

Preetched connector leads 98, 99 are attached to each of the pads which is an external contact. For clarity purposes, only two of these are shown, one of which is soldered to the contact for the common electrode. Preetched connector leads are only one type of connection means which may be employed in the invention. Alternatively, eyelets, protruding pins, etc., may be employed. The entire structure is now cast in resin to form an integral structure. After casting, the connector leads 98, 99 are bent at right angles.

A specific electroluminescent numeric indicator made by the process described with respect to FIG. 3 is shown in FIG. 4. The substrate 102 contains the character electrodes 72, 74, the pillars 68, the interconnecting leads 104, the pads for the SCRs 106, the pads for the external contacts 108, and pads 110 for attaching certain SCR leads thereto.

The SCRs 92 and their leads 94 are bonded to their respective pads, as shown.

The connector leads 98, 99 are shown soldered to their respective pads and bent at right angles.

Layer 108 comprises the dielectric 80 and phosphor 82 layers over which is situated a block 110 comprising common electrode 84, plastic layer 86, filter 88 and casting resin 100.

Layer 112 contains the protective layer 96 and casting resin 100.

In an alternate embodiment of the invention, the means for applying signals to the gate electrodes of the SCRs is built into the integral structure as a constituent component thereof. For example, a chip of a seven-segment decoder is bonded to a pad in the same fashion as the SCRs are bonded to their pads and leads from the decoder are bonded to pads and connected in the same manner as the leads from the SCR chips. The decoder chip may be added to the same layer of the monolithic structure as the SCRs or, alternatively, an additional layer may be built up in the manner described in said U.S. Pat. No. 3,374,129, and the decoder chip bonded to a pad in said additional layer. Thus, it is to be understood that the embodiments shown are illustrative only, and that many variations and modifications may be made without departing from the principles of the invention herein disclosed and defined by the appended claims.

I claim:

1. An electroluminescent display device, comprising:
a substrate,
A transparent first electrode, and
an electroluminescent phosphor layer disposed between said first electrode and said substrate,
said substrate including
an insulating layer on the surface thereof, at least one second electrode in a plane separated from said insulating layer,
a plurality of electrical conductors in a plane separated from said second electrode,
electrical interconnecting means extending in a direction substantially perpendicular to said electrical conductors for electrically interconnecting said second electrode and selected one of said electrical conductors,
insulating material for isolating selected ones of said electrical conductors, said electrical interconnecting means and said second electrode, and
at least one semiconductor chip bonded to one of said electrical conductors.

2. An electroluminescent display device in accordance with claim 1, further including a layer of polarized material arranged above said first electrode.

3. An electroluminescent display device in accordance with claim 1, further including means coupled to selected ones of said electrical conductors so as to facilitate external connections thereto.

4. An electroluminescent display device in accordance with claim 1, further including a dielectric layer disposed between said substrate and said phosphor layer.

5. An electroluminescent display device, comprising:
a substrate
a transparent first electrode, and
an electroluminescent phosphor layer disposed between said first electrode and said substrate,
said substrate including
an insulating layer on the surface thereof,
a plurality of second electrodes in a plane separated from said insulating layer,
a plurality of printed circuit paths in a plane separated from said second electrode means,
conductive members extending in a direction substantially perpendicular to said printed circuit paths, said members being molecularly united to selected ones of said second electrodes and at least one of said printed circuit paths so as to be integral therewith,
insulating materials for isolating selected ones of said printed circuit paths, second electrodes, and conductive members, and
a plurality of discrete semiconductor chips bonded to selected ones of said printed circuit paths.

6. An electroluminescent display device in accordance with claim 5 wherein said semiconductor chips comprise switching devices.

7. An electroluminescent display device in accordance with claim 5 wherein said semiconductor chips comprise silicon-controlled rectifiers.

8. An electroluminescent display device in accordance with claim 7, the anodes of said silicon-controlled rectifiers being bonded to said printed circuit paths.

9. An electroluminescent display device in accordance with claim 8, further including a plurality of leads coupling the cathodes and gates of said silicon-controlled rectifiers to selected ones of said printed circuit paths.

10. An electroluminescent display device in accordance with claim 9, further including a plurality of connector leads coupled to selected ones of said printed circuit paths.

11. An electroluminescent display device in accordance with claim 10, said device being packaged in an assembly to form a plug-in unit.

12. An electroluminescent display device in accordance with claim 5 wherein said semiconductor ships comprise switching devices and decoders.

* * * * *